United States Patent [19]
Kunc

[11] 3,720,574
[45] March 13, 1973

[54] FILTER ELEMENT

[75] Inventor: Frank C. Kunc, East Brunswick, N.J.

[73] Assignee: Scott Paper Company, Delaware County, Pa.

[22] Filed: July 28, 1971

[21] Appl. No.: 166,990

[52] U.S. Cl. ............161/156, 117/98, 117/138.8 D, 161/157, 161/159, 161/170, 161/184, 161/190
[51] Int. Cl. ...............................................B32b 5/18
[58] Field of Search......161/159, 168, 157, 156, 170, 161/190, 184; 117/98, 138.8 D

[56] References Cited

UNITED STATES PATENTS

| | | | |
|---|---|---|---|
| 3,269,887 | 8/1966 | Windecker | 161/160 |
| 3,314,425 | 4/1967 | Coppick | 161/159 |

*Primary Examiner*—William J. Van Balen
*Attorney*—William J. Foley et al.

[57] ABSTRACT

A flexible, reticulated, polyurethane foam which has been rigidified by coating the strands with an epoxy resin is especially useful as a filter element due to the unexpected increase in dirt holding capacity of the rigidified foam as compared to the flexible, untreated foam.

4 Claims, No Drawings

FILTER ELEMENT

BACKGROUND OF THE INVENTION

1. Field of the Invention

The present invention relates generally to improved air filters, to an improved method of making said filters, and to a rigidified polyurethane foam useful in preparing said filters. More particularly, the present invention relates to a self-supporting, cellular, filter element which comprises a reticulated, polyurethane foam having the strands coated with a cured epoxy resin.

2. Description of the Prior Art

Polyurethane foams are produced by the reaction of a polyhydroxy-containing compound, usually a polyester polyol or a polyether polyol, and an organic polyisocyanate in the presence of a blowing gas. The blowing gas is usually carbon dioxide, which is formed by the incorporation of water in the reactant mix, and by the reaction between the water and an excess of the organic polyisocyanate.

The resulting polyurethane foam consists of a series of interconnected strands with very thin membrane-like films connecting most of the strands to form cells. Foams useful in the present invention are what are commonly referred to as reticulated polyurethane foams. These foams are well known in the art and are characterized by the fact that the membrane-like films, or cell walls, have been removed. Cell walls can be removed by any one of several methods including, for example, soaking the foam in an aqueous solution of an alkali metal hydroxide or igniting a mixture of combustible gases within the cellular material.

Flexible foams, including polyurethane foams, have previously been employed as filter elements. However, with the foam previously used it was essential to include a support means or casing for the foam.

U.S. Pat. No. 3,108,866 issued to Saunders discloses a gas filter in which a flexible, polyurethane foam is used as the filter element. The foam is described as "-self-supporting in that it possesses an appreciable degree of resistance to compressional forces and, when subjected to a deforming force, it will yield, but when such forces are relieved the material will spring back to its original shape." In use the foam is enclosed in a chamber which acts as a support for the foam.

U.S. Pat. No. 2,961,710 issued to Stark discloses a filter prepared from a flexible, polyurethane foam which has been treated to increase the number of interconnecting cells.

U.S. Pat. No. 3,212,242 issued to Floxine discloses the use of a flexible, reticulated, polyurethane foam in an air filter. In use the foam filter is wrapped around a rigid supporting screen.

U.S. Pat. No. 2,966,960 issued to Rocklin discloses an air filter consisting of a housing and a disposable filtering element wherein the filtering element is a flexible foam, such as a polyurethane foam, supported on a screen cylinder.

Methods of rigidifying flexible foams have also previously been suggested. In U.S. Pat. No. 3,269,887 issued to Windecker there is disclosed an open-cell, flexible foam, such as polyurethane foam, in which the open cells are impregnated with a settable resin, such as an epoxy resin, and a curing agent for the resin. The impregnated foam can be formed into a desired shape and then hardened to produce a rigid, light-weight structure.

However, it has not previously been recognized that reticulated polyurethane foams which have been rigidified by coating the strands thereof with a cured epoxy resin were especially useful as filter elements.

SUMMARY OF THE INVENTION

In accordance with the present invention there is produced an improved air filter comprising a self-supporting cellular filter element, said element comprising a reticulated polyurethane foam the strands of which are coated with a cured epoxy resin.

DESCRIPTION OF THE PREFERRED EMBODIMENTS

In accordance with the present invention, a reticulated polyurethane foam is coated with an epoxy resin. The resulting rigidified foam is useful as an air filter due to the unexpected increase in dirt holding capacity.

Polyurethane foams may be produced in pore densities in the range of from about 10 to about 150 pores per linear inch, by techniques which are well known in the art. Foams of various pore sizes can be coated with an epoxy resin and utilized as filter elements in accordance with the present invention.

In addition to single sheets of foam it has also been found that foam composites — i.e. two or more layers of foam, preferably of different pore densities can be treated and are useful in carrying out the present invention. The foam composites can be prepared by bonding several layers of foam together. This can be done by any method known in the art such as adhesive bonding and flame lamination. It is preferred, in carrying out the present invention, to coat a foam composite of two or three layers of foam. Each layer of the composite preferably has a different pore density. If a three layer composite is employed the outer, or upper, layer can have, for example, a pore density of thirty pores per lineal inch, the middle layer could have a pore density of 50 pores per lineal inch and the inner, or lower layer, a pore density of 90 pores per lineal inch. It is especially preferred to employ a two layer foam composite, such as one in which a layer of reticulated polyurethane foam having a pore density of 80 pores per lineal inch is flame laminated to a second layer of reticulated polyurethane foam having a pore density of 40 pores per lineal inch.

The single sheet of foam or foam composite is coated with an expoxy-resin-containing formulation comprising an epoxy resin and a curing agent for the resin. Suitable epoxy resins are any of those well-known in the art and include, for example, Epon 815, a bishenol-A epoxy resin modified with a mono-epoxy diluent designed to afford low viscosity;

Epon 152, an epoxy-novolac-type polyfunctional resin and,

Epon 828, an unmodified bisphenol-A epoxy resin. All of the above-mentioned Epon resins are available from Shell Chemical Company, New York, New York.

Flame retardant properties can be imparted to the resulting filters by including in the coating formulation an adduct prepared by reacting the epoxy groups on the resin with a halogen containing hydroxyl compound. An especially preferred adduct is that obtained by reacting 10 parts of an unmodified bisphenol-A epoxy resin, such as Epon 829, available from Shell Chemical Company, with 1 part of tetra bromine bisphenol-A. A further improvement in flame retardancy is noted when a small amount of antimony trioxide is included in the coating formulation.

In addition to the epoxy resin, the coating formulation also contains, as an essential component, a curing agent for the epoxy resin. Suitable curing agents are any of those which are well known in the art and include, for example, aliphatic amines such as diethylenetriamine, aromatic amines such as metaphenylene diamine and methylene dianiline, anhydrides such as maleic anhydride and nadic methyl anhydride and eutectic mixtures thereof and catalytic curing agents such as boron trifluoride monoethylamine. When the anhydrides are employed it is especially preferred to include a tertiary amine as an activator for the anhydride.

The viscosity of the coating formulation can be controlled by adjusting the temperature of the formulation during the coating operation. If the foam, or foam composite, is to be coated at room temperature a sufficient amount of a solvent, such as alcohol or toluene, can be added to the coating formulation.

The apparatus used for coating foam in accordance with the present invention comprises a tank into which the coating formulation is placed and a pair of horizontal rolls defining a nip. Means are provided for transporting the foam to be coated through the tank where it is immersed in the coating formulation and subsequently through the nip defined by the rolls to remove excess coating formulation.

The resin retained by the foam can be varied by either (a) the temperature of the coating formulation, (b) the pressure on the rolls defining the nip or a combination of (a) and (b). As the temperature is increased, the viscosity of the coating formulation decreases and the amount of resin retained by the foam is decreased. It is preferred to treat the foam in a coating formulation the temperature of which is maintained at from room temperature to about 160°F. As pointed out above, at room temperature it is often necessary to add a small amount of a solvent to the coating formulation. Increasing the pressure on the rolls defining the nip also reduces the amount of resin retained by the fibers. It is especially preferred to achieve optimum resin retention to employ a pressure on the rolls of from about 40 psi to about 60 psi.

The amount of epoxy resin retained by the foam is preferably equal to from about 100 percent to 300 percent of the initial weight of the foam. It is especially preferred to retain from about 150 percent to 200 percent of the weight of the foam.

For use as a filter, the epoxy resin coated polyurethane foam, prepared as above, is first cut to size and then reheated to at least the heat deflection temperature of the epoxy resin. The reheating softens the epoxy resin and the foam can then be formed into any desired shape. The resulting foam structure has been found to be especially useful as a filter element.

In order to describe the present invention so that it may be more clearly understood, the following examples are set forth. These examples are set forth primarily for the purpose of illustration, and any specific enumeration of detail contained therein should not be interpreted as a limitation on the concept of this invention.

The method used to determine load deflection, as set forth in the examples, was that described in ASTM Test D-1564 which is a recognized ASTM Test (suffix D) for testing polyurethane foam. The more rigid foams have a higher load deflection value than the flexible foams.

EXAMPLE I

A coating formulation was prepared comprising:
100 parts of Epon 152, an epoxy novolac-type resin available from Shell Chemical Company, New York, New York,
10 parts of methylene chloride and
23 parts of Epon curing agent T, also available from Shell Chemical Company.

The formulation was placed in a coating apparatus comprising a tank and a pair of horizontal rolls defining a nip therebetween.

A foam composite, comprising a 5/32 of an inch thick piece of reticulated polyurethane foam having a pore density of approximately 80 pores per linear inch laminated to a ½ inch thick piece of reticulated polyurethane foam having a pore density of approximately 40 pores per linear inch, was treated by first submerging the foam composite in the coating mixture and then passing the coated foam between the pair of rolls to remove excess coating formulation from the foam.

The coated foam was allowed to cure, reheated to soften the epoxy resin, and formed into an annular or ring-like filter element having an outside diameter of ten inches and a height of 2¼ inches. Upon cooling, the foam again became rigid. A flexible gasket was placed on each end of the filter element. The resulting filter element was spin coated with a filter gel composition comprising:
100 parts of polypropylene glycol,
2.5 parts of aerosil 200, a submicroscopic pyrogenic silica available from Degussa, Inc.,
0.5 parts of Tween 20, a nonionic surface active agent available from Atlas Chemical Company, and
2.0 parts of Renex 30, a nonionic detergent also available from Atlas Chemical Company.

The amount of filter gel retained by the foam was equal to 32.1 grams.

The resulting filter element was tested for filter efficiency in accordance with the standard filter test designated as SAEJ-726 using a tray-type filter, an air flow of 320 CFM, a standard SAC course type dust and a dust feed of 3.0 grams per minute. The resistance to flow was measured and dirt was fed in until the resistance increased by 10 inches of water. The elapsed time before this increase took place was approximately 60 minutes during which time the filter collected approximately 158 grams of dust.

By comparison a sample of the flexible foam composite coated with 30.2 grams of the same filter gel composition collected only 113.1 grams of dust and the resistance increased by 10 inches of water in about 38 minutes.

A second comparison was run in which the flexible foam composite was first coated with a polyvinyl chloride resin and subsequently with 31.2 grams of the above-described filter gel. This foam collected 119.1 grams of dust and the resistance increased by 10 inches of water in about 40 minutes.

EXAMPLE II

Ninety parts of Epon 152 an epoxy-novolac type polyfunctional resin available from Shell Chemical Company, New York, N. Y. was combined with 10 parts of Epon 828, an unmodified bisphenol-A epoxy resin also available from Shell Chemical Company and 10 parts of diethylenetriamine.

The mixture was placed in a coating apparatus comprising a tank and a pair of horizontal rolls defining a nip therebetween. The temperature of the ocating mixture was raised to 160°F and the pressure on the rolls defining the nip was adjusted to 70 psi.

A foam composite, comprising a 3/32 of an inch thick piece of reticulated polyurethane foam having a pore density of 80 pores per linear inch which is flame laminated to a ⅝ of an inch thick piece of reticulated polyurethane foam having a pore density of 40 pores per linear inch, was treated by first submerging the foam composite in the coating mixture and then passing the coated foam between the pair of rolls to remove excess coating mixture from the foam.

The amount of epoxy resin coating on the foam was equal to approximately 240 percent of the weight of the foam.

The filter element had a load deflection (25 percent) of 18 psi and an improved dirt holding capacity when compared with the flexible reticulated polyurethane foam.

EXAMPLE III

An epoxy resin adduct was prepared by reacting 100 parts of Epon 829, an unmodified bisphenol-A epoxy resin containing a catalyst specific for the reaction of epoxy groups with hydroxyl groups, available from Shell Chemical Company with 10 parts of tetra bromine bisphenol-A.

A coating formulation was prepared comprising:
80 parts of the above-mentioned epoxy resin adduct
20 parts of Epon 152, an epoxy-novolac-type resin available from Shell Chemical Company
65 parts of methanolic anhydride
2 parts of Sipene VC2 a difunctional tertiary amine available from Alcolac Chemical Corporation, Baltimore, Maryland, and
11 parts of antimony trioxide.

The coating formulation was placed in the coating apparatus described in Example I. The temperature of the coating mixture was raised to 160°F and the pressure on the rolls defining the nip was adjusted to 40 psi.

A foam composite, as described in Example I was coated by first submerging it in the coating formulation and then passing the coated material between the rolls.

The amount of epoxy resin coating on the foam was equal to 162 percent of the weight of the foam.

The filter element had a load deflection (25 percent) of 8.1 psi and improved dirt holding capacity as compared to the untreated polyurethane foam composite.

EXAMPLE IV

A coating formulation was prepared comprising:
100 parts of Epon 815, a bisphenol-A epoxy resin modified with a mono-epoxy diluent designed to afford low viscosity, available from Shell Chemical Company
5 parts of boron trifluoride monoethylamine, and
15 parts of ethyl alcohol.

A foam composite was prepared comprising a ⅝ of an inch thick piece of reticulated polyurethane foam having a pore density of 35 pores per linear inch and a ⅛ of an inch thick piece of reticulated polyurethane foam having a pore density of 90 pores per linear inch.

The foam was coated, at room temperature in the coating apparatus described in Example I. The coated foam was cured, reheated, formed into an annular filter element having an outside diameter of 10 inches and a height of 2.4 inches and coated with a filter gel composition, as in Example I. Effectiveness as a filter was tested, also as in Example I. The dirt holding capacity was equal to 305 grams. By comparison a similar filter prepared from the untreated foam composite had a dirt holding capacity of 172 grams.

What is claimed is:

1. A self-supporting filter element comprising a reticulated polyurethane foam the strands of said foam being coated with a cured epoxy resin.

2. A self-supporting filter element, as claimed in claim 1, in which the reticulated polyurethane foam is a foam composite comprising two layers of reticulated polyurethane foam bonded together.

3. A self-supporting filter element, as claimed in claim 1, in which the resin coating also includes the reaction product of an epoxy-containing resin and a halogen-containing hydroxyl compound.

4. A self-supporting filter element, as claimed in claim 1, in which the amount of epoxy resin coating the foam is equal to from about 100 percent to about 300 percent of the weight of the foam.

* * * * *